3,043,803
COPOLYMERS OF FORMALDEHYDE AND ISOCYANIC ACID
Cameron David Lewis, Robert Neal MacDonald, and Carl Earle Schweitzer, Wilmington, Del., assignors to E. I. du Pont de Nemours and Company, Wilmington, Del., a corporation of Delaware
No Drawing. Filed May 21, 1959, Ser. No. 814,664
9 Claims. (Cl. 260—67)

This invention relates to new compositions of matter and to their preparation, and, more particularly, it relates to copolymers of formaldehyde and isocyanic acid.

In U.S. Patent 2,768,994, issued October 30, 1956, to R. N. MacDonald there is described and claimed a polymer of formaldehyde, called a polyoxymethylene, which has excellent toughness and thermal stability. This thermoplastic polymer is useful as a moldable composition from which many shaped articles, such as films, fibers, filaments, sheets, rods, tubes, pipes, and the like, may be fabricated. In U.S. 2,828,287, issued March 25, 1958, to T. L. Cairns, E. T. Cline and P. J. Graham, there is described and claimed a copolymer of formaldehyde and a fluorinated aldehyde, and in copending application Serial No. 550,198 filed by E. T. Cline on November 30, 1955, there is disclosed and claimed a copolymer of formaldehyde and a polyglycol ether. These copolymeric compositions are useful for special purposes. Another copolymeric composition has now been discovered, namely a copolymer of formaldehyde and isocyanic acid.

It is an object of this invention to provide a copolymer of formaldehyde and isocyanic acid as a novel composition of matter. It is another object of this invention to provide a copolymer of formaldehyde having a high melting point. It is still another object of this invention to provide an adhesive suitable for use in joining two polyoxymethylene surfaces to each other. It is still another object of this invention to provide a process for preparing a copolymer of formaldehyde and isocyanic acid. Still other objects will become apparent to those skilled in the art as the details of this invention are more fully described hereinafter.

The above objects are accomplished in accordance with this invention by preparing a reaction medium comprising an organic liquid which is a solvent for isocyanic acid and formaldehyde, optionally dissolving in the reaction medium a formaldehyde polymerization initiator in the amount of 0.0001 to 1.0 part by weight of initiator per 1000 parts of reaction medium, maintaining the temperature of the reaction medium at −50° C. to +30° C. while agitating the medium and while introducing isocyanic acid and formaldehyde into the medium in proportions of about 0.01 to 1.5 parts by weight of isocyanic acid per part of formaldehyde, and recovering a solution or a dispersion of particles of a copolymer of isocyanic acid and formaldehyde in said organic liquid. The recovered copolymer contains 3 to 75 mol percent of isocyanic acid, based on carbon analysis, and has an inherent viscosity of at least 0.05, preferably above 1.0, measured at 60° C. on 0.5% by weight solutions of the copolymer in p-chlorophenol containing 2.0% by weight of alpha-pinene. As an alternative procedure, isocyanic acid may be dissolved in the reaction medium prior to the introduction of formaldehyde into the medium.

Because isocyanic acid polymerizes spontaneously under most conditions of solvent and temperature employed, it is not always necessary to include a formaldehyde initiator in the system. In the absence of initiator it appears that formaldehyde enters into the copolymerization, once the isocyanic starts to polymerize. However, a formaldehyde polymerization initiator may be desirable to control or speed the copolymerization.

A convenient way of operating is to sweep monomeric formaldehyde through purifying traps held at −15° C., then into the top of a reaction chamber held at −50° C. to +30° C. and containing a rapidly agitated dimethylformamide or dimethylacetamide solution of isocyanic acid, and, if desired, a formaldehyde polymerization initiator. The copolymer of formaldehyde and isocyanic acid is isolated by evaporation of the reaction medium or by other methods known to those skilled in the art.

The examples which follow serve to illustrate, but are not intended to limit, this invention. Parts are by weight, unless otherwise stated.

*Example 1*

One hundred parts of alpha-polyoxymethylene was pyrolyzed and the monomeric formaldehyde which formed was continually swept at atmospheric pressure with a slow stream of nitrogen through two traps held at −15° C., then into the top of a reaction chamber held at −30° C. and containing a rapidly agitated solution of 18 parts of isocyanic acid and 0.1 part of diphenylamine in 850 parts of dimethylformamide. A mineral oil trap protected the system from the air. After 15 minutes, the temperature was raised to 0° C. and the process continued for 60 minutes longer. The slightly cloudy liquid was allowed to settle. A sample of the clear supernatant solution was poured off and a layer of it evaporated at room temperature under vacuum to give a clear colorless brittle film. On the hot stage microscope it did not soften until 239–250° C. At 293–315° C. no further flow was noted. Compression molding of this polymer at 165–170° C. under pressure gave brittle films that no longer softened at 250° C. and were no longer soluble in dimethylformamide. An inherent viscosity of 0.07 at 0.5% concentration by weight in dimethylformamide at 25° C. was observed. *Analysis.*—C, 35.95; H, 5.24; N, 22.7. Infrared absorption bands at 2.95, 3.35, 5.85, 6.45, and 9–11 microns indicate a structure $[(-CH_2O)_xOCNH-]_n$.

*Example 2*

In the manner of Example 1, monomeric formaldehyde from 70 parts of alpha-polyoxymethylene was passed into a reaction vessel containing a solution of 17 parts of isocyanic acid and 0.1 part of diphenyl amine in 850 parts of dimethylformamide, which system was maintained at 0° C. for one hour. The copolymer was isolated by evaporating solvent at 40° C. under vacuum. The tacky film that remained at this point could be drawn into short filaments when moistened with dimethylformamide. Treatment with methanol produced a dry powdery product. *Analysis.*—C, 36.6; H, 5.54; N, 18.67.

A small amount of this polymer moistened with dimethylformamide was pressed between two strips of polyoxymethylene film at 120° C. for 15 minutes. There was considerable resistance to a 90° pull from opposite ends of the strips and one strip actually broke outside the joint.

*Example 3*

Example 2 was repeated, except that the copolymerization was carried out at −30° C. instead of 0° C. The resulting clear dimethylformamide solution was evaporated to a pasty solid under reduced pressure and extracted with methanol to give 2 parts of product which analyzed 37.92% C, 6.20% H, and 14.27% N.

*Example 4*

Sixty parts of alpha-polyoxymethylene was pyrolyzed and the monomeric formaldehyde generated was purified with cold traps in the manner of Example 1 before being passed into a reactor containing a solution of 6 parts isocyanic acid and 0.1 part diphenylamine in 522 parts toluene at −30° C. After six minutes the temperature was raised to 15° C. and addition of formaldehyde was continued for 90 minutes longer. During this time gel particles precipitated on the walls of the reactor, but the liquid remained clear. On standing at room temperature, more precipitate formed. The reaction mixture was filtered, the precipitate was washed wtih methanol and dried in a vacuum oven. The yield was 5.9 parts. The inherent viscosity was found to be 0.09 at 0.5% concentration by weight in p-chlorophenol containing 2% alpha-pinene at 60° C. *Analysis.*—C, 36.08; H, 5.48; N, 15.56.

*Example 5*

In the manner of Example 1, 50 parts of alpha-polyoxymethylene was pyrolyzed and the monomeric formaldehyde thus generated was passed into a reactor containing a solution of 0.1 part by weight of diphenylamine in 670 parts of toluene and maintained at −20° C. After 10 minutes, there was added 0.1 part of tri-n-amylamine and at the same time slow addition of a solution of 6 parts of isocyanic acid in 70 parts of toluene was started. Polymer began to form at this stage. After 10 minutes from the start of the isocyanic acid addition the temperature was raised to 20° C. and the simultaneous addition of formaldehyde and isocyanic acid continued for one hour. After 10 minutes' additional stirring, the system was filtered and washed with acetone, the product was air-dried overnight and vacuum-oven dried 8 hours at 40° C. There was obtained 19.5 parts of white powdery solid. The inherent viscosity of this material was observed to be 0.08 at 0.5% concentration by weight in p-chlorophenol containing 2% by weight of alpha-pinene. *Analysis.*—C, 39.57; H, 6.66; N, 2.25. Infrared absorption at 5.8 microns indicated urethane linkages along with the —$CH_2$—O— linkages, evidenced by absorption at 9.2 and 11 microns.

*Example 6*

In the manner of Example 1, 50 parts of alpha-polyoxymethylene was pyrolyzed and the monomeric formaldehyde thus generated was passed into a reactor containing a solution of 18 parts of isocyanic acid in 470 parts of dimethylacetamide held at −20° C. until formaldehyde could be detected at the exit tube of the reactor (ca. 15 minutes). Thereafter the temperature was raised to 0° C. and formaldehyde passage continued for 80 minutes longer. The system was then stirred at 0° C. under nitrogen for 16 hours. After standing one day at room temperature the reaction mixture was filtered to give 4.9 parts of insoluble white solid which exhibited an inherent viscosity of 1.69 at 0.5% concentration by weight in p-chlorophenol containing 2% by weight of alpha-pinene. Infrared analysis showed absorption bands characteristic of each of the homopolymers. The copolymer contained 38.14% carbon, 6.07% hydrogen, and 7.45% nitrogen, and on a metal block this copolymer did not soften until 275–280° C. In contrast, polyoxymethylene melted at 174° C. and polyisocyanic acid is infusible in the same test. Thus, the copolymer differed radically in melting point from the corresponding homopolymers. A solution of 15 parts of this polymer in 39 parts of p-chlorophenol at 90° C. was spread onto a piece of viscose cloth and the solvent evaporated in a vacuum oven at 100° C. for 3 hours. The stiff, coated fabric obtained could be bent double without cracking. The coating was water-impervious. Another portion of this same p-chlorophenol solution of the copolymer was spun from a warm hypodermic needle into a cold methanol bath to give a congealed monofilament. Further extraction with chloroform gave a stiff self-supporting opaque filament.

*Example 7*

Equal volumes of anhydrous liquid formaldehyde and liquid isocyanic acid were placed in a reaction vessel maintained at a temperature of −95° C. The reactor and contents were then slowly warmed to about −35° C., the reactor was evacuated to 1 mm. Hg pressure and brought back to atmospheric pressure by introducing dry nitrogen gas into the vapor space of the reactor. The reactor was then maintained at 0° C. for about 15 minutes, during which time the contents of the reactor polymerized. The product was a stiff, white, solid block. The product was ground to a powder, a portion of which was analyzed and other portions of which were pressed into films at about 190°–200° and 5000 p.s.i. for 1 minute. The films were white, varying from opaque to translucent, and were stiff, although they could be bent without breaking. The analysis by infrared techniques showed absorption bands at 2.95, 3.35, 5.85, 6.45, and 9–11 microns indicating the copolymeric structure of $$[(-CH_2O)_xOCNH-]_n$$

Chemical analysis indicated the product to contain from 1–2 mols of formaldehyde per 3 mols of isocyanic acid. Portions of the molded films were found to be insoluble in benzyl alcohol, which is a solvent for formaldehyde homopolymers.

The amount of isocyanic acid which is employed in the initial reaction charge is at least 4% by weight of the monomeric formaldehyde being processed. As a rule, larger amounts of isocyanic acid, i.e., in the range of 10 to 150% of the monomeric formaldehyde being processed, are used.

In the preferred practice isocyanic acid is dissolved in the reaction medium, which is preferably dimethylformamide, dimethylacetamide, or a hydrocarbon containing 3–10 carbon atoms, formaldehyde polymerization initiator is added, if desired, the solution is agitated, and anhydrous monomeric formaldehyde is then passed into the space above the agitated solution. As an alternative, the isocyanic acid and monomeric formaldehyde may be added simultaneously to the agitated reaction medium. As another alternative, no reaction medium is used, and a mixture of the two monomers in liquid form is polymerized.

The reaction is conducted in a reaction medium which remains liquid under the conditions used and which is a solvent for isocyanic acid and for formaldehyde. Suitable media are dialkylformamides, e.g., dimethyl, diethyl and dipropylformamides, dialkylacetamides, e.g., dimethyl, diethyl and dipropylacetamides, and hydrocarbons containing 3–10 carbon atoms per molecule, such as toluene, cyclohexane, and heptane.

The amount of polymerization medium used is not critical. Usually an amount is used which is sufficient to produce a fluid slurry of the resulting copolymer. This amount, generally, is between 4 and 100 times the weight of the formaldehyde and isocyanic acid being processed.

The polymerization can be effected in the presence of known formaldehyde polymerization initiators. Examples of such initiators are those disclosed in United States Letters Patent 2,734,889, issued to Frank C. Starr, Jr. on February 14, 1956; 2,768,994, issued to Robert N. MacDonald on October 30, 1956, 2,828,286, issued to Robert N. MacDonald on March 25, 1958; 2,841,570, issued to Robert N. MacDonald on July 1, 1958; 2,844,561, issued to Max F. Bechtold and Robert N. MacDonald on July 22, 1958; and 2,848,437, issued to William P. Langsdorf, Jr., and Gelu S. Stamatoff on August 19, 1958. Other initiators operable in the process of this invention are disclosed and claimed in copending application Serial No. 521,878, filed by H. H. Goodman and L. T. Sherwood on July 13, 1955, these initiators being onium salts, e.g., hexadecylpyridinium acetate, octadecyltrimethylammonium caproate, tetra - n - butylammonium laurate, trimethylstearylammonium laurate, benzyltrimethylammonium hexyl phenoxide, dimethyldi(hydrogenated tallow)ammonium acetate, dimethyldidodecylphosphonium bromide, tridecylsulfonium iodide, and the like. The amount of the initiator employed in the polymerization step, usually is in the range of 0.0001 to 1.0 part by weight of initiator per 1000 parts of reaction medium.

Because improved stability is realized through an aftertreatment which entails capping of end groups, this constitutes a desirable but not essential step in the preparation of the polymers of this invention. This end-capping is effected by acylation processes such as those disclosed and claimed in copending application Serial No. 681,188, filed by S. Dal Nogare and J. O. Punderson on August 30, 1957.

The polymerization can be effected at temperatures of from −50° C. to +30° C. The particular temperature selected is that which is most favorable for the conjoint polymerization of the formaldehyde and isocyanic acid. Pressures normally are atmospheric, although subatmospheric or superatmospheric pressures are operable.

Monomeric formaldehyde from any source can be used, although it should be sufficiently pure that it is at least 99.9% formaldehyde. A convenient source is the pyrolysis vapor of alpha-polyoxymethylene. In any event, before introduction of the formaldehyde into the polymerization zone, the formaldehyde should be rigorously purified by passing it through a train of traps held at a suitable low temperature, e.g., −15° C. Another procedure for preparing purified formaldehyde is disclosed and claimed in United States Letters Patent 2,848,500 issued to Dennis L. Funck on August 19, 1958.

Monomeric isocyanic acid may be prepared after the manner of Linhard, Z. anorg. u. allgem. Chem. 236, 200 (1935); 239, 155 (1938). Cyanuric acid is pyrolyzed at 450° C. to isocyanic acid, which is then redistilled over phosphorous pentoxide under reduced pressure.

The copolymers of this invention correspond to

[(CH$_2$O)$_x$CONH—]$_n$ and [(CH$_2$O)$_x$—(CONH)$_y$—]$_n$ wherein $x$ and $y$ are positive integers and $n$ is a positive integer sufficiently large that the said copolymer has an inherent viscosity of at least 0.05 when measured at 60° C. in a p-chlorophenol solution containing 0.5 by weight of said copolymer and 2.0% by weight of alpha-pinene. In the latter of the two formulas the relative values of $x$ and $y$ are such that the ratio $x/y$ equals 0.33 to 33. The former are low molecular weight and soluble in dimethylformamide at ordinary temperatures. Clear films can be cast from these solutions. The copolymers corresponding to the latter structure are high molecular weight and they are insoluble in dimethylformamide but soluble in p-chlorophenol at 65° C. Irrespective of molecular weight, these copolymers survive surprisingly high temperatures. For example, some do not soften until temperatures of 240–280° C. are reached.

The copolymers of this invention yield clear to translucent films and are useful as protective coatings for rigid substrates. They are also useful as a coating for a fabric and as adhesives, for example, for making laminates of high molecular weight polyoxymethylene films. Other uses are in the fabrication of various shaped articles such as sheets, filaments, fibers, rods, tubes, pipe, blown bottles, and the like.

We claim:
1. A copolymer of formaldehyde and isocyanic acid containing from 3 to 75 mol percent of isocyanic acid in its combined form in the said copolymer.
2. A copolymer of formaldehyde and isocyanic acid having the general structure

[(CH$_2$—O)$_x$—(CONH)$_y$]$_n$ wherein $x$ and $y$ are positive integers having a value such that $x/y$=0.33 to 33 and $n$ is a positive number sufficiently large that the said copolymer has an inherent viscosity of at least 0.05 when measured at 60° C. in solution in p-chlorophenol containing 0.5% by weight of said copolymer and 2.0% by weight of alpha-pinene.
3. A shaped article comprising the copolymer of claim 1.
4. A film comprising the copolymer of claim 1.
5. A filament comprising the copolymer of claim 1.
6. A coated fabric in which the coating comprises the copolymer of claim 1.
7. A process for preparing a copolymer of formaldehyde and isocyanic acid which comprises forming a reaction medium comprising an organic liquid which is a solvent for both formaldehyde and isocyanic acid, dissolving isocyanic acid and formaldehyde in said reaction medium in proportions of about 0.01 to 1.5 parts by weight of isocyanic acid per part of formaldehyde, agitating said reaction medium and maintaining the temperature of said reaction medium at −50° C. to +30° C. while particles of a copolymer of isocyanic acid and formaldehyde form therein, and recovering a dispersion of said particles in said reaction medium.
8. The process of claim 7 in which said organic liquid is selected from the group consisting of hydrocarbons containing 3–10 carbon atoms, dialkylformamide, and dialkylacetamide.
9. The process of claim 8 in which the copolymerization is effected in the presence of 0.0001 to 1.0 part by weight per 1000 parts of said organic liquid of an initiator from the group consisting of aliphatic amines, cycloaliphatic amines, primary aromatic amines, trihydrocarbon phosphines, quaternary ammonium salts, and quaternary phosphonium salts.

References Cited in the file of this patent
UNITED STATES PATENTS
2,296,249   Austin et al. _____ Sept. 22, 1942